May 27, 1930. W. G. DUNN 1,760,349
ACCESSORY MOUNTING
Filed Dec. 5, 1927
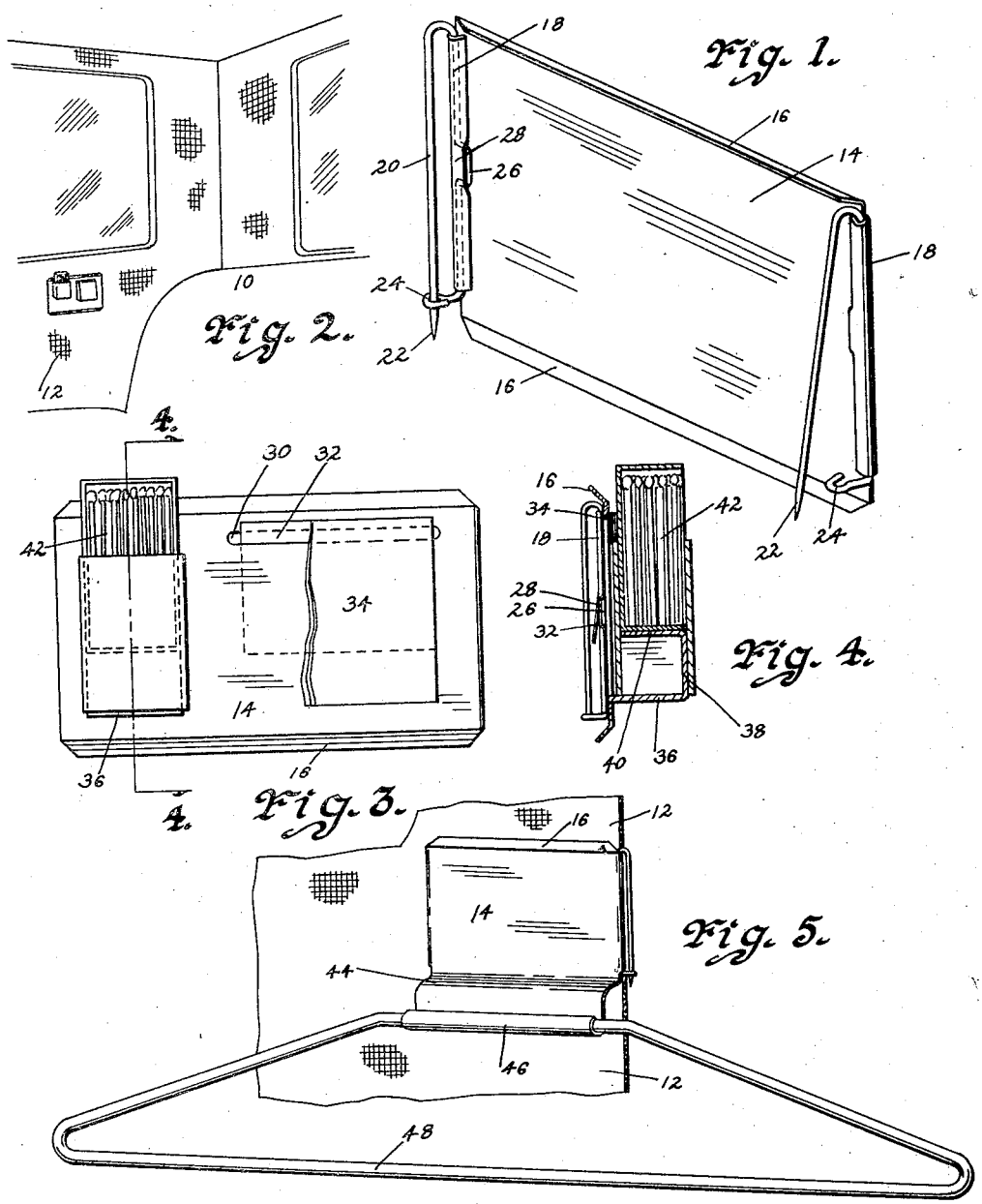
Witness
C. J. Dykstra
Inventor
William G. Dunn
by Bair & Freeman Attorneys Patented May 27, 1930

1,760,349

UNITED STATES PATENT OFFICE

WILLIAM G. DUNN, OF CLARINDA, IOWA

ACCESSORY MOUNTING

Application filed December 5, 1927. Serial No. 237,792.

The object of my invention is to provide an accessory mounting of simple, durable and comparatively inexpensive construction.

More particularly it is my object to provide a support having a pair of pin like fastening elements mounted therein whereby the support may be mounted upon the fabric ordinarily used in interior finishings of automobiles, thus making it convenient for the mounting of the support upon the automobile wall. In this connection it may be said that with the fine finishing of present day automobiles, it is quite desirable to have a convenient and easy means of mounting accessories of various kinds in the automobile and yet not mar the appearance nor the beauty of the automobile.

It is quite difficult to use fastening elements such as screws because they injure the finish and in many of the automobile bodies, metal is entirely used so ordinary fastening elements are almost unusable and it is, therefore, my object to provide a convenient means of fastening an accessory in place in any automobile and yet allow the same accessory to be removed as desired.

Still another object is to provide a relatively large support which may have formed thereon, match box holders or pad holders, coat hangers or the like, thus providing an article of great utility and adaptability.

With these and other objects in view, my invention consists in the construction, arrangement and combination of the various parts of my accessory mounting whereby the objects contemplated are attained, as hereinafter more fully set forth, pointed out in my claims, and illustrated in the accompanying drawings, in which:

Figure 1 is a perspective view of the back side of my improved accessory mounting.

Figure 2 is a perspective view of a portion of the inside of an automobile with the accessory mounting placed in position therein.

Figure 3 is a front plan view of the accessory mounting with a match box holder and pad holder formed upon the face of the support.

Figure 4 is a central vertical sectional view taken on the line 4—4 of Figure 3; and Figure 5 is a perspective view of the mounting used for supporting a coat hanger.

In the accompanying drawings, I have used the reference numeral 10 to indicate generally an automobile of the sedan type wherein the interior finish is formed of fabric 12 such as mohair or velour.

My improved accessory mounting is adapted to be detachably secured upon the fabric within the automobile and in Figure 2 of the drawings, the same is shown as being mounted upon the wall of the sedan just below a window thereof.

The mounting includes a support 14 substantially rectangular in outline and of greater length than width. The top and bottom edges of the support 14 are formed with inturned marginal flanges 16. The flanges serve to reinforce the support 14 and at the same time to space the back side thereof from the material upon which the support is mounted and to provide the necessary space which is consumed by the fastening elements which are mounted upon the support as will hereinafter be more fully set forth.

Each end of the support 14 is rolled or curved as at 18 to provide a tubular receiving socket for a pin like fastening element 20. Each fastening element 20 is formed of a single piece of wire bent to provide a shank adapted to be received in the rolled edge 18 of the support 14.

The pin or fastening portion of the fastening element extends on the outside of the rolled edge 18 and projects downwardly and has its end pointed or sharpened as at 22. The opposite or free end of the pin forming the fastening element, is turned outwardly from the support 14 and recurved as at 24 for providing a keeper for the sharpened end 22 of the pin or fastening element 20.

In order to prevent the fastening element from having pivotal movement within the rolled edge 18 of the support 14, I provide an offset or crank portion 26 in the fastening element 20 which projects in under the free edge of the rolled portion 18 as clearly shown in Figure 1 of the drawings.

The crank portion 26 when held in position by the rolled edge 18 as at 28, is held against any pivotal movement. A fastening element is provided at each end of the support 14 so as a matter of fact, the entire support may be mounted at two spaced points upon the fabric or finishing of the inside of an automobile.

In Figure 3 of the drawings, I have shown the support as being formed with an elongated slot 30 for receiving the back side 32 of a pad 34. The pad 34 may serve for taking memoranda or notes in an automobile which is quite desirable when travelling across country for keeping records and the like.

Incidentally upon the same support, I provide a match box holder which is formed by blanking a portion of the material of the support and bending it first at right angles to the main support as at 36 and then bending it again at right angles so that it projects upwardly in a vertical plane as indicated by the reference numeral 38.

The free end of the blanked out portion is then inturned as at 40 for providing the necessary base upon which a box of matches 42 may rest. The holder is so arranged as to receive the ordinary so-called box of "safety matches."

In Figure 5 of the drawings, I have shown the lower edge of the support 14 being curved outwardly as at 44 and then formed with a rolled edge 46 for receiving a coat hanger 48. The coat hanger is formed of wire and is mounted within the rolled edge 46 of the support 14.

It will be noted that the accessory mounting may be conveniently used in automobiles and can be used to support articles of utility which is of great importance in connection with the present construction of automobiles.

Numerous articles may be mounted upon the support 14 such as cigar lighters, memorandum pads, ash receiving receptacles and devices for indicating various mileages and times for the changing of oil and for greasing.

Some changes may be made in the construction and arrangement of the parts of my device without departing from the real spirit and purpose of my invention, and it is my intention to cover by my claims, any modified forms of structure or use of mechanical equivalents, which may be reasonably include within their scope.

I claim as my invention:

1. An article of the class described comprising a support of rectangular outline and of greater length than width, a pin like fastening element lockingly engaged and held against pivotal movement by each end of said support on the back side thereof, a keeper formed from a part of said fastening element, said keeper retaining the free end of said fastening element in spaced position from the back of said support whereby a fabric upon which said article is mounted and through which said fastening elements are extended may be pierced at two points by each element to support the article and prevent its upward movement and removal from the fabric.

2. An article of the class described comprising a support, a pair of spaced pin like fastening elements mounted on the back of said support whereby it may be secured in position upon fabric at two spaced points with said fastening elements projecting into the fabric, then downwardly and then out of the fabric, the face of said support serving to carry accessories whereby the article serves as a means of mounting such accessories upon the fabric and hook means secured to the support and associated with the portions of the fastening elements which project out of the fabric as and for the purposes stated.

Des Moines, Iowa, November 17, 1927.

WILLIAM G. DUNN.